United States Patent [19]

Cesaroni

[11] Patent Number: 5,469,915
[45] Date of Patent: Nov. 28, 1995

[54] PANEL HEAT EXCHANGER FORMED FROM TUBES AND SHEETS

[75] Inventor: Anthony J. Cesaroni, 9 Heathmore Ct., Unionville, Ontario, Canada, L3R 8J1

[73] Assignee: Anthony J. Cesaroni, Unionville, Canada

[21] Appl. No.: 70,721

[22] Filed: May 19, 1993

[30] Foreign Application Priority Data

May 29, 1992 [GB] United Kingdom ............... 9211413

[51] Int. Cl.$^6$ .................. F28F 1/32; F28F 3/00
[52] U.S. Cl. ............... 165/171; 165/76; 165/166
[58] Field of Search ................ 165/171, 183, 165/168, 180, 905, 166, 76; 29/890.04, 890.038, 890.039, 890.041, 890.042

[56] References Cited

U.S. PATENT DOCUMENTS

| | | | |
|---|---|---|---|
| 1,974,665 | 9/1934 | Schnetzer et al. | 189/34 |
| 2,616,671 | 11/1952 | Wakeman | 257/245 |
| 2,992,545 | 7/1961 | Walker | 165/905 X |
| 3,157,229 | 11/1964 | Wennerberg | 165/167 |
| 3,194,305 | 7/1965 | Haried | 165/168 |
| 3,327,776 | 6/1967 | Butt | 165/80 |
| 3,528,496 | 9/1970 | Kun | 165/166 |
| 3,561,524 | 2/1971 | Satterthwaite | 165/76 |
| 3,648,768 | 3/1972 | Schöll | 165/171 |
| 3,831,664 | 8/1974 | Pogson | 165/80.5 |
| 4,040,476 | 8/1977 | Telle et al. | 165/76 |
| 4,060,070 | 11/1977 | Harter | 165/171 X |
| 4,069,811 | 1/1978 | Tabor | 165/171 X |
| 4,080,702 | 3/1978 | Chatfield et al. | 29/890.042 |
| 4,158,908 | 6/1979 | Block et al. | 165/171 X |
| 4,204,522 | 5/1980 | Wilson | 165/168 |
| 4,235,281 | 11/1980 | Fitch et al. | 165/171 X |
| 4,237,971 | 12/1980 | Olsson et al. | 165/171 |
| 4,287,883 | 9/1981 | Kyrias | 126/445 |
| 4,289,117 | 9/1981 | Butcher | 126/436 |
| 4,336,838 | 6/1982 | Ecy | 165/109 |
| 4,398,596 | 8/1983 | Lauro et al. | 165/167 |
| 4,406,130 | 9/1983 | Hemmerich | 165/171 X |
| 4,524,757 | 6/1985 | Buckley | 126/426 |
| 4,546,797 | 10/1985 | Cadars | 138/38 |
| 4,597,436 | 7/1986 | Hagemeister et al. | 165/76 |
| 4,804,041 | 2/1989 | Hasegawa et al. | 165/166 |
| 4,815,534 | 3/1989 | Fuerschbach | 165/167 |
| 4,815,535 | 3/1989 | Hagemeister | 165/173 |
| 4,955,435 | 9/1990 | Shuster et al. | 165/170 |
| 5,114,776 | 5/1992 | Cesaroni | 428/131 |

FOREIGN PATENT DOCUMENTS

| | | | |
|---|---|---|---|
| 0286399 | 10/1988 | European Pat. Off. | |
| 0286400 | 10/1988 | European Pat. Off. | |
| 0304261 | 2/1989 | European Pat. Off. | |
| 0337802 | 10/1989 | European Pat. Off. | |
| 2322730 | 5/1973 | Germany | |
| 3033452 | 9/1980 | Germany | |
| 1136 | 1/1980 | Japan | 29/890.04 |
| 71995 | 4/1984 | Japan | 29/890.04 |
| 62-13997 | 1/1987 | Japan | |
| 197888 | 8/1988 | Japan | 165/179 |
| 846983 | 7/1981 | U.S.S.R. | 165/171 |
| 806707 | 12/1958 | United Kingdom | 165/171 |

*Primary Examiner*—Martin P. Schwadron
*Assistant Examiner*—L. R. Leo

[57] ABSTRACT

A panel heat exchanger is disclosed. The panel heat exchanger has a plurality of parallel tubes in a spaced apart side-by-side relationship, the tubes being located between two plastic sheets that envelope and conform to the shape of the tubes so as to maintain said tubes in the side-by-side relationship. The sheets being bonded together between said tubes. One end of each of the plurality of tubes is in fluid flow communication with an inlet manifold and the other end of each of the plurality of tubes is in fluid flow communication with an outlet manifold. Processes for the manufacture of the panel heat exchanger are also disclosed. The panel heat exchanger may be used in a variety of uses, including automotive, refrigeration and domestic uses.

7 Claims, 4 Drawing Sheets

PANEL HEAT EXCHANGER FORMED FROM TUBES AND SHEETS

The present invention relates to a panel heat exchanger, and especially to panels for a panel heat exchanger, in which the panels are formed from both tubes and sheets. Preferably, all of the panel is formed from a thermoplastic polymer. In embodiments, the panel heat heat exchanger is in the form of a baseboard heater on a wall of a room.

Panel heat exchangers formed from thermoplastic polymers and methods for the manufacture of such heat exchangers are known. For instance, a number of heat exchangers formed from thermoplastic polymers and methods for the manufacture thereof are disclosed in PCT patent application WO91/02209 of A. J. Cesaroni, published 1991 Feb. 21, and in the published patent applications referred to therein. A preferred material of construction is aliphatic polyamide.

While panel heat exchangers formed from thermoplastic polymers have been fabricated by the techniques described in the above published patent applications, improvements in the construction and methods of fabrication would be beneficial to add further flexibility and economy to the fabrication and use of the panel heat exchangers.

A panel heat exchanger formed from tubes and sheet has now been found.

Accordingly, the present invention provides a panel for a panel heat exchanger comprising:

a plurality of parallel tubes in a spaced apart side-by-side relationship, said tubes being located between two plastic sheets that envelope and conform to the shape of the tubes so as to maintain said tubes in the side-by-side relationship, said sheets being bonded together between said tubes; and an inlet manifold and an outlet manifold;

each of said plurality of tubes being bonded at opposing ends thereof to said manifolds such that one end of each of said plurality of tubes is in fluid flow communication with the inlet manifold and the other end of each of said plurality of tubes is in fluid flow communication with the outlet manifold.

In a preferred embodiment of the panel of the present invention, the diameters of the tubes are in a plane.

In another embodiment, the sheets are bonded to the tubes.

In a further embodiment, the tubes are linear.

In a still further embodiment, the tubes are non-linear, especially sinusoidal in shape.

In addition, the present invention provides a panel heat exchanger comprising at least two panels in a laminar stacked relationship, each panel comprising a plurality of parallel tubes in a spaced apart side-by-side relationship, said tubes being located between two plastic sheets that envelope and conform to the shape of the tubes so as to maintain said tubes in the side-by-side relationship, said sheets being bonded together between said tubes;

an inlet manifold and an outlet manifold;

each of said plurality of tubes being bonded at opposing ends thereof to said manifolds such that one end of each of said plurality of tubes is in fluid flow communication with the inlet manifold and the other end of each of said plurality of tubes is in fluid flow communication with the outlet manifold;

the inlet manifolds and outlet manifolds of each of the panels being aligned and sealed together in a fluid tight manner so as to provide inlets and outlets for the panel heat exchanger, respectively.

In addition, the present invention provides a process for the manufacture of a panel heat exchanger comprising the steps of:

(a) placing a plurality of parallel tubes in a spaced apart side-by-side relationship on a first sheet;

(b) placing a second sheet over the said plurality of tubes;

(c) heating said sheets and plurality of tubes so as to cause the sheets to envelope and conform to the shape of the tubes and to effect bonding of said sheets together between said tubes;

(d) bonding the ends of said tubes into inlet and outlet manifolds so there is fluid flow communication between said inlet and said outlet manifold through said tubes; and (e) said manifolds having edges that are coplanar with the plane of the tubes to facilitate bonding of the inlet and outlet manifolds to a like inlet and outlet manifold of another panel to form a stack of panels.

In a preferred embodiment of the method, the tubes are linear.

In another embodiment, the process is a continuous process in which the first sheet, tubes and second sheet are heated to cause the sheets to envelope and conform to the shape of the tubes and to effect bonding of said sheets together between the tubes.

In a further embodiment, steps (a)–(c) are controlled so that the ends of said tubes extend to or beyond each end of said sheets.

The present invention relates to panels for panel heat exchangers. The panel heat exchangers are formed from a plurality of such panels by bonding the panels together in a laminar manner. The invention will be described with particular reference to the drawings in which.

Figure 1:
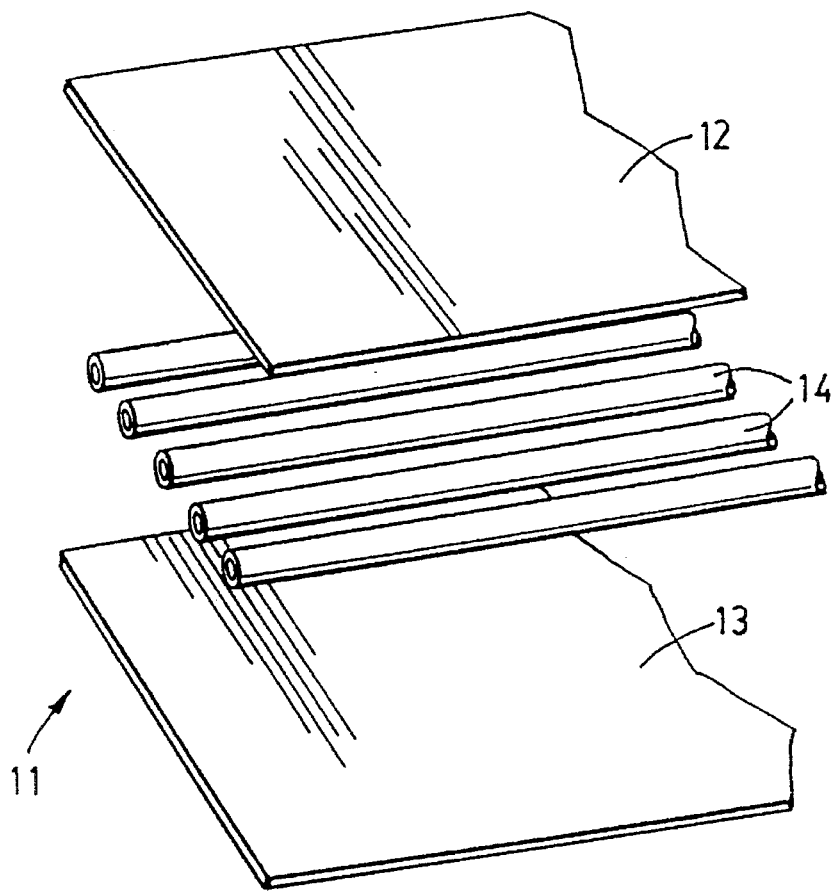
FIG. 1 is a schematic exploded representation of tubes and sheets of a panel.

Referring to FIG. 1, a panel (generally indicated by 11) is shown in exploded view prior to the conforming of the sheets to the shape of the tubes. Panel 11 is formed from an upper sheet 12, a lower sheet 13 and a plurality of tubes 14. Tubes 14 are located between upper sheet 12 and lower sheet 13, and are shown as being in a side-by-side spaced apart relationship.

Figure 2:
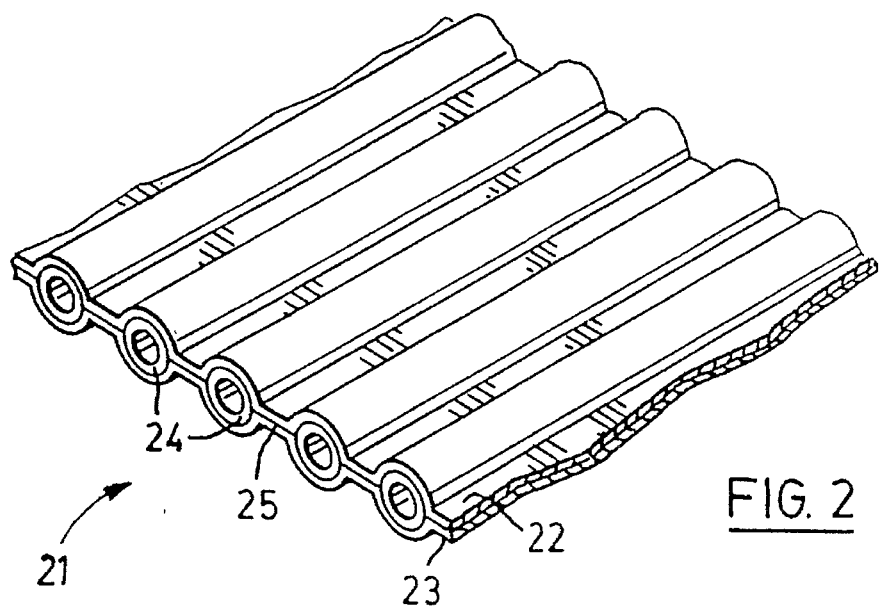
FIG. 2 is a schematic representation of a section of a panel.

FIG. 2 shows a panel 21 with sheets conforming to the shape of the tubes. Tubes 24 are located between upper sheet 22 and lower sheet 23, with both sheets enveloping tubes 24 and conforming to the shape thereof. Upper sheet 22 is bonded to lower sheet 23 at bonds 25 located between tubes 24. Tubes 24 are in a side-by-side relationship, and maintained in that relationship by upper sheet 22 and lower sheet 23 being bonded together at bonds 25 between tubes 24.

Figure 3A:
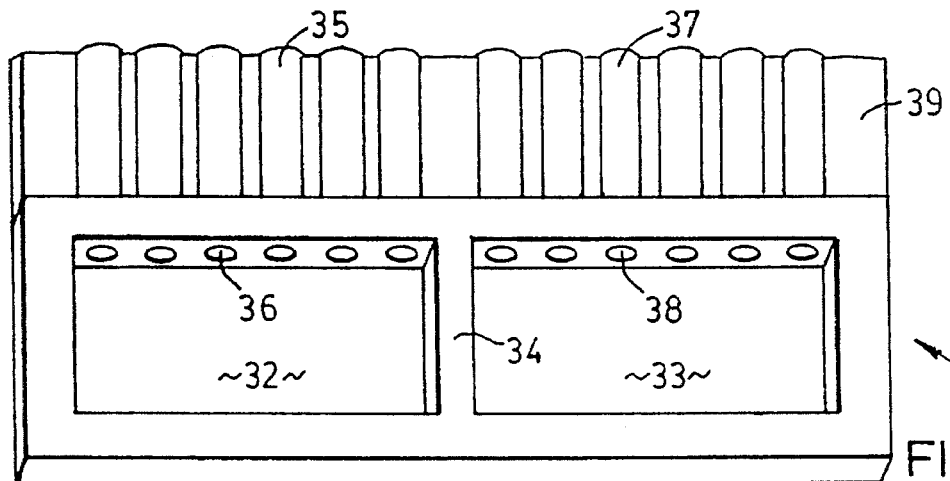
FIGS. 3A and 3B are schematic representations of manifolds of a panel.

FIG. 3A shows a panel end 31 having an inlet manifold 32 and an outlet manifold 33. Inlet manifold 32 is separated from outlet manifold 33 by barrier 34. Tubes 35 are in fluid flow communication with inlet manifold 32 through orifices 36. Similarly, tubes 37 are in fluid flow communication with outlet manifold 33 through orifices 38. Upper sheet 39 is shown as covering and conforming to the shape of tubes 35 and 37; the lower sheet that conforms to the tubes and is bonded to upper sheet 39 is not shown.

Figure 3B:
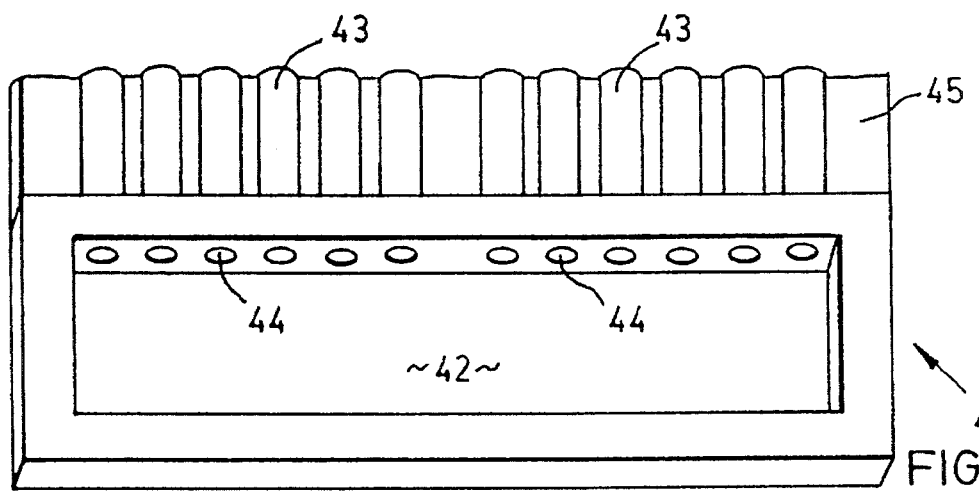

FIG. 3B is similar to FIG. 3A, except that there is only one manifold i.e. the barrier 34 in FIG. 3A has been omitted. FIG. 3B shows a panel end 41 having a manifold 42. Tubes 43 are in fluid flow communication with manifold 42 through orifices 44. Upper sheet 45 is shown as covering and conforming to the shape of tubes 43; the lower sheet that conforms to the tubes and is bonded to upper sheet 45 is not shown.

Figure 4A:
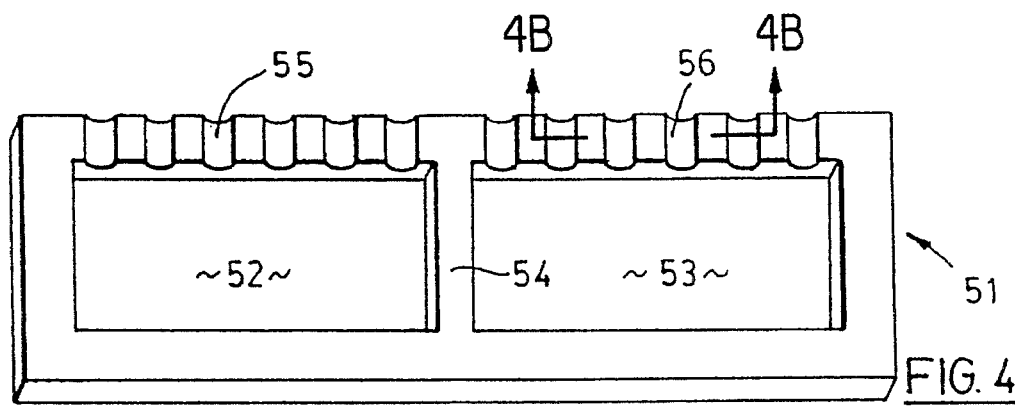
FIGS. 4A and 4B are schematic representations of alternative embodiments of manifolds of a panel.

FIG. 4A shows end section 51 that is of similar design to panel end 31 shown in FIG. 3A. However, two of end sections 51 in face to face relationship would be required to form panel end 31. FIG. 4A shows a end section 51 having an inlet manifold 52 and an outlet manifold 53. Inlet manifold 52 is separated from outlet manifold 53 by barrier 54. End section 51 has grooves 55 and 56 in a location corresponding to the location of tubes 35 and 37 in FIG. 3A. Grooves 55 and 56 are of circular cross-section and of a size to accept tubes 35 and 36.

Figure 4B:

FIG. 4B shows a cross-section of end section 51 along A—A of FIG. 4A. End section member 61 is shown as having grooves 62 of substantially semi-circular cross section, but being adapted so as to accept tubes.

Figure 5:
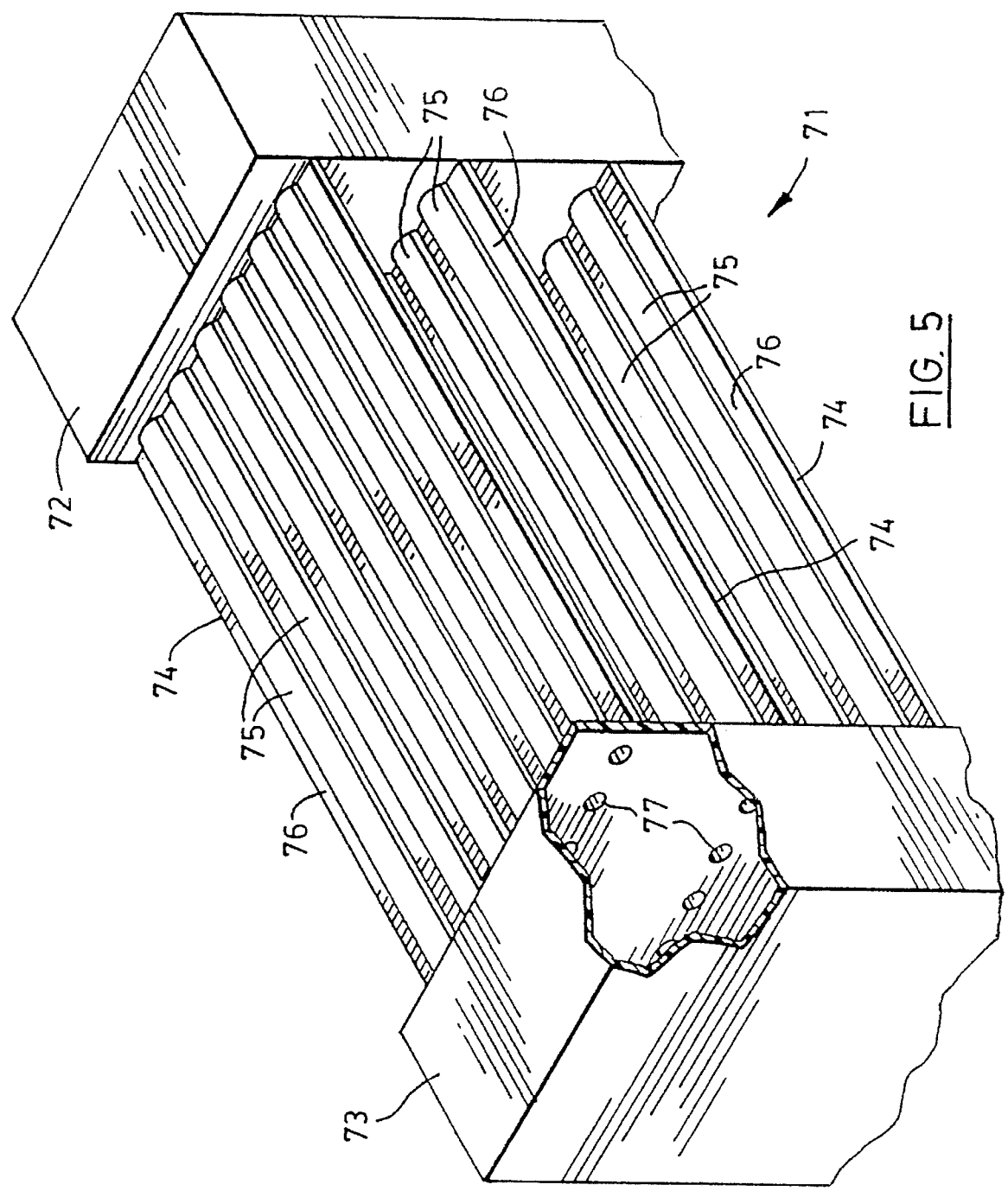
FIG. 5 is a schematic representation of a plurality of panels in laminar arrangement in the form of a panel heat exchanger.

FIG. 5 shows a panel heat exchanger 71 that has an inlet manifold 72 and an outlet manifold 73. Inlet manifold 72 and outlet manifold 73 are joined together by a plurality of panels 74. Each of panels 74 are of the construction described above, with a plurality of tubes 75 conformed in sheets 76 and extending from inlet manifold 72 to outlet manifold 73. Outlet manifold 73 is shown as being partially cutaway, to reveal orifices 77 of tubes 76.

Figure 6A:
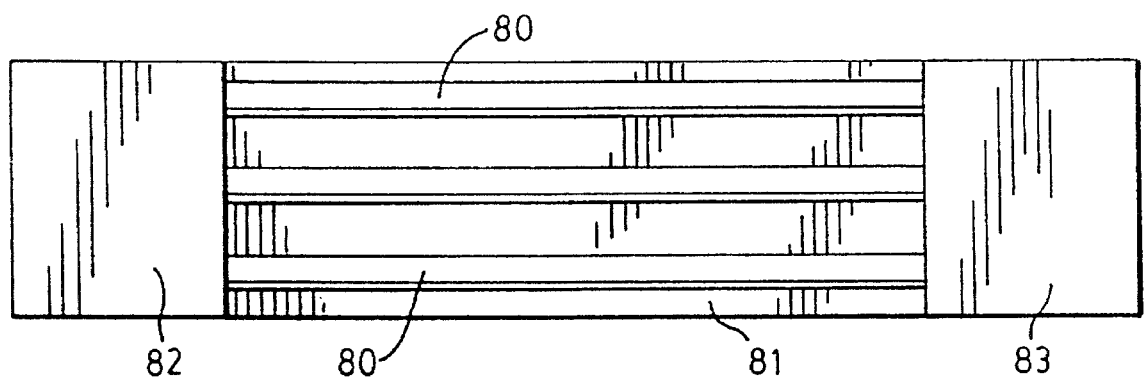
FIGS. 6A and 6B are plan views of tubes and sheet with manifold in which the tubes are linear and sinusoidal, respectively.
Figure 6B:
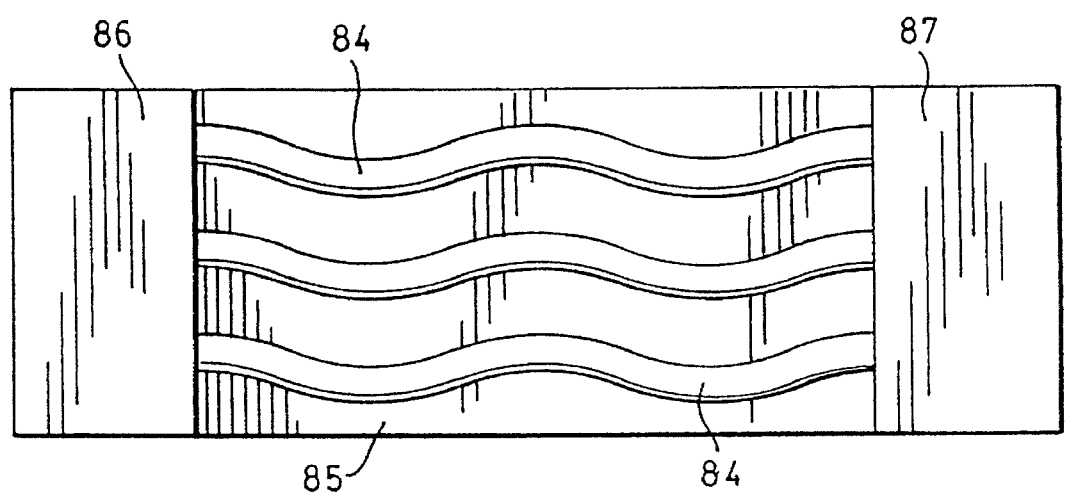

While the tubes have been shown in the above drawings as being both linear and parallel to each other, it is to be understood that this is a preferred embodiment and that other arrangements of tubes in a side-by-side relationship may be used. For example, the tubes may be non-linear i.e. curved. In particular, the tubes may be in a side-by-side relationship with each tube being sinusoidal rather than linear. Such an embodiment is illustrated in FIGS. 6A and 6B. FIG. 6A shows a plan view of parallel tubes 80 enveloped in sheet 81 and extending between inlet manifold 82 and outlet manifold 83. In contrast, FIG. 6B shows a plan view of sinusoidal tubes 84 enveloped in sheet 85 and extending between inlet manifold 86 and outlet manifold 87.

A number of fabrication techniques may be used to fabricate the panels described herein. For instance, a plurality of tubes 14 may be placed between upper sheet 12 and lower sheet 13. Tubes 14 may be discrete tubes of the desired length or tubes 14 may be in the form of continuous lengths of tubing that are laid down in the required manner and subsequent to being conformed into place between the upper and lower sheets, cut to the desired length. Sheets 12 and 13 may be conformed to the shape of the tubes 14 and bonded together between tubes 14 by use of a heated press e.g. a heated press with platens having grooves to facilitate location of the tubing in its side-by side relationship. Heat and pressure may be used to bond the upper and lower sheets together, optionally with use of an adhesive to facilitate bonding. Preferably, the sheets are also bonded to the tubing, as this helps maintain the tubing in position. During the bonding step, it is important to maintain the integrity of the tubing. This may require suitable selection of the material of the tubing and sheet and/or use of adhesives so that bonding of the sheets may be effected without, for example, collapsing the tubing. An inert gas pressure may be applied to the inside of the tubing to assist in maintaining the integrity of the tubing. The tubing and sheets may be fabricated from the same material or from different materials, depending in particular on the environments and other conditions of operation with respect to the tubing and the sheet.

The panels may also be fabricated using continuous processes. In an example of such a process, the first and second sheet are continuously fed between a pair of rolls, especially rolls having grooves in the surface thereof corresponding to the location of the tubes; such grooves would assist in preventing collapsing of the tubes during fabrication of the panel. The tubes are fed to the rolls between the sheets. The rolls are heated to effect bonding of the sheets and enveloping of the sheet around the tubes. The continuous combination of sheets and tubes thus obtained can then be cut into suitable lengths.

The combination of sheet and tubing may then be bonded to the manifold. To do so, the combination of sheet and tubing should be characterized by having the tubing extend to the edge of the sheet or beyond the sheet for a distance sufficient to permit insertion of the tubing into an inlet or outlet manifold, depending in part on the method of bonding of tubes and sheet to the manifold. The manifold may be characterized by having orifices in the wall thereof into which the tubing may be inserted and bonded. Alternatively, end sections of the type shown in FIG. 4A may be used in which event the ends of the tubing are laid in the grooves; a second similar end section is then placed over the tubing to complete the manifold, and heated in a press to effect bonding and formation of the manifold.

The design of the manifolds is selected depending on the construction of the heat exchanger and the desired flow pattern through the heat exchanger. For instance, if the flow pattern was to be directly from one end to the other, two manifolds of the type shown in FIG. 3B would be used, one as inlet manifold and one as outlet manifold. Alternatively, a manifold of the type shown in FIG. 3A could be used on one end and a manifold of the type shown in FIG. 3B could be used on the other end; in operation, fluid would flow from inlet manifold 32, through tubes 35 to manifold 42 and return through tubes 37 to outlet manifold 38. In this latter mode of operation, the inlet and outlet manifolds are on the same end of the panel, with the manifold on the opposite end of the panel being merely to reverse the direction of flow through the panel. It is to be understood that shims could be used to cover the entire inlet or outlet portions of the manifolds, thereby altering flow patterns, so as to maintain a desired residence time of the fluid in the panel heat exchanger by restrictions to the path of the fluid.

In operation, fluid would enter the inlet manifold e.g. inlet manifold 72, pass through tubes (74) to outlet manifold 73. The panel heat exchanger would normally have the manifolds of a construction such that fluid passed several times from one side of the panel heat exchanger to the other e.g. in a zig-zag manner, to increase the efficiency and effectiveness of the operation of the panel heat exchanger.

The sheets may be formed from a variety of polymer compositions. The composition selected will depend primarily on the end use intended for the heat exchanger, especially the temperature of use and the environment of use, including the fluid that will be passed through the heat exchanger and the fluid e.g. air, external to the heat exchanger. In the case of use on a vehicle, the fluid may be air that at times contains salt or other corrosive or abrasive matter, or the fluid may be liquid e.g. radiator fluid. While it is preferred to use the same or similar polymer compositions for both sheet and tubing, the sheets and tubes may be fabricated from different polymers, the requirement being that acceptable bonding may be achieved.

A preferred polymer of construction is polyamide. Examples of polyamides are the polyamides formed by the condensation polymerization of an aliphatic dicarboxylic acid having 6–12 carbon atoms with an aliphatic primary diamine having 6–12 carbon atoms. Alternatively, the polyamide may be formed by condensation polymerization of an aliphatic lactam or alpha,omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid) and 1,12-dodecanedioic acid. Examples of diamines are 1,6-hexamethylene diamine, 2-methyl pentamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid and amino dodecanoic acid. Preferred examples of the polyamides are polyhexamethylene adipamide and polycaprolactam, which are also known as nylon 66 and nylon 6, respectively.

The panels and sheet of the present invention have been described with particular reference to the use of polyamides as the polymer used in the fabrication thereof. It is to be understood, however, that other polymers may be used, the principal consideration being the environment of use of the panel heat exchanger e.g. the properties of the fluid passing through and over the panel heat exchanger, the temperature and pressure of use and the like. Examples of other thermoplastic polymers that may be used are polyethylene, polypropylene, fluorocarbon polymers, polyesters, thermoplastic and thermoset elastomers e.g. polyetherester elastomers, neoprene, chlorosulphonated polyethylene, and ethylene/propylene/diene (EPDM) elastomers, polyvinyl chloride and polyurethane. It is to be understood that the tubing could be metallic tubing, although plastic tubing is preferred.

In preferred embodiments of the present invention, the combined thickness of sheet and tubing used in the fabrication of the panel heat exchanger i.e. the thickness as measured from inside the tube to the exterior of the panel, is less than 0.7 mm, and especially in the range of 0.07–0.50 mm, particularly 0.12–0.30 mm. The thickness of the tubing per se will, however, depend to a significant extent on the proposed end use and especially the properties required for that end use. The sheet may be significantly thinner than the tubing as the physical demands on the sheet tend to be substantially less than on the tubing.

The polymer compositions used in the fabrication of the panel heat exchangers may contain stabilizers, pigments, fillers, including glass fibres, and the like, as will be appreciated by those skilled in the art.

The polymer composition of the tubing and of the sheet may be the same or different, depending on the intended use of the panel heat exchangers. All seals in the panel heat exchanger need to be fluid tight seals to prevent leakage of fluid from the heat exchanger.

The panel heat exchangers and the process of manufacture provide a versatile and relatively simple method of fabricating heat exchangers. Simple moulds and fabrication techniques may be used, including continuous processes using rolls.

The heat exchangers may be used in a variety of end-uses, depending on the polymer(s) from which the heat exchanger has been fabricated and the intended environment of use of the heat exchanger. In embodiments, the panel heat exchangers may be used in automotive end uses e.g. as part of the water and oil cooling systems. The panel heat exchangers may also be used in less demanding end uses e.g. in refrigeration and in comfort heat exchangers, in domestic end-use, including for the heating of rooms, floors and the like. In the latter embodiments, the panel heat exchangers could be in the form of baseboard heaters in rooms or parts of the walls or ceilings, or embedded in the floor or under the floor covering e.g. under the carpet.

In a particular embodiment, the tubes are side-by-side but sinusoidal in shape. An example of use of a panel heat exchanger having tubes in a sinusoidal arrangement is in the form of a baseboard heater. In such use, the panel heat exchanger would normally have just one layer of tubes i.e. the panels would not be stacked. A fluid, usually water, is passed through the length of the panel heat exchanger which could be many feet in length e.g. run the length of one or more walls around a room. Appropriate manifolds would be required as inlets and outlets to the panel heat exchanger. The fluid, presumably heated water, would be fed to and from the respective manifolds. It might be convenient to locate both the inlet and outlet at the same end of the panel heat exchanger and to utilize the manifold at the opposite end to reverse the flow of fluid, as has been discussed above. The sinusoidal arrangement of the tubes is believed to be able to better counteract expansion of tubing due to heating or, if the tubes are polyamide and the fluid is water, expansion and creep of the tubes due to the presence of the water.

The present invention is illustrated by the following examples.

EXAMPLE I

As an illustration of the invention, a panel of the type described above and in the form of a baseboard heater for a room was fabricated from polyhexamethylene adipamide compositions. The panel was approximately 2 meters in length and 20 cm in width, and had 20 tubes. Both the tubing and the sheet had a thickness of 0.25 mm.

The sheet was coated with a composition of benzyl alcohol, phenol and polyamide as a bonding agent to facilitate bonding the tubing and sheet. The use of such compositions in the bonding of polyamides is described in European patent application 0 287 271 of A. J. Cesaroni, published 1988 Oct. 19.

A first sheet was laid on a platen of a press, the platens used in the press having grooves corresponding to the tubes in the panel. The tubes were then laid on the first sheet and the second sheet was laid on top. The combination of tubes and sheet was then subjected to heat and pressure between platens in the press so as to effect bonding. Because of equipment limitations, the procedure was repeated a number of times to obtain the panel of the length given above.

I claim:

1. A panel heat exchanger consisting essentially at least two panels in a laminar stacked relationship, each panel comprising a plurality of parallel tubes in a spaced apart side-by-side relationship, said tubes being located between two plastic sheets that envelope and conform to the shape of the tubes so as to maintain said tubes in the side-by-side relationship, said sheets being bonded together between said tubes; wherein the distance measured from the inner surface of a tube to the outer surface of one of the plastic sheets enveloping said tube is less than 0.7 mm; and each of said plurality of tubes being bonded at opposing ends thereof to inlet and outlet manifolds such that one end of each of said plurality of tubes is in fluid flow communication with an inlet manifold and the other end of each of said plurality of tubes is in fluid flow communication with an outlet manifold; the inlet manifolds and outlet manifolds of each of the panels being aligned and sealed together in a fluid tight manner so as to provide inlets and outlets for the panel heat exchanger, respectively.

2. The panel heat exchanger of claim 1 in which the diameters of the tubes are in a plane.

3. The panel heat exchanger of claim 2 in which the sheets are bonded to the tubes.

4. The panel heat exchanger of claim 1 in which the tubes are linear.

5. The panel heat exchanger of claim 1 in which the tubes are non-linear.

6. The panel heat exchanger of claim 5 in which the tubes are sinusoidal.

7. The panel heat exchanger of claim 1 in which the plastic is polyamide.

* * * * *